US012676501B2

(12) United States Patent
Wild et al.

(10) Patent No.: US 12,676,501 B2
(45) Date of Patent: Jul. 7, 2026

(54) METHODS AND SYSTEMS FOR ESTIMATING THE OPERATIONAL STATUS OF AN ELECTRICAL GENERATOR IN A DISTRIBUTED ENERGY RESOURCE SYSTEM

(71) Applicant: Schneider Electric Industries SAS, Rueil Malmaison (FR)

(72) Inventors: Jean Wild, Coublevie (FR); François Cazals, Claix (FR); David Pampliega, Dos Hermanas (ES)

(73) Assignee: Schneider Electric Industries SAS, Rueil Malmaison (FR)

( * ) Notice: Subject to any disclaimer, the term of this patent is extended or adjusted under 35 U.S.C. 154(b) by 415 days.

(21) Appl. No.: 18/195,486

(22) Filed: May 10, 2023

(65) Prior Publication Data

US 2023/0369890 A1 Nov. 16, 2023

(30) Foreign Application Priority Data

May 11, 2022 (EP) .................................... 22305699

(51) Int. Cl.
| | |
|---|---|
| *H02J 13/12* | (2026.01) |
| *H02J 3/38* | (2026.01) |
| *H02J 101/24* | (2026.01) |
| *H02J 103/30* | (2026.01) |

(52) U.S. Cl.
CPC .............. *H02J 13/12* (2026.01); *H02J 3/381* (2013.01); *H02J 2101/24* (2026.01); *H02J 2103/30* (2026.01)

(58) Field of Classification Search
CPC .. H02J 13/00002; H02J 3/381; H02J 2203/20; H02J 2300/24; H02J 13/00022
See application file for complete search history.

(56) References Cited

U.S. PATENT DOCUMENTS

| | | |
|---|---|---|
| 2014/0277788 A1 | 9/2014 | Forbes, Jr. |
| 2015/0188482 A1 | 7/2015 | Berkowitz et al. |
| 2017/0046458 A1* | 2/2017 | Meagher ................ G06F 30/20 |

(Continued)

OTHER PUBLICATIONS

Pouraltafi-Kheljan, et al., "Power Generation Nowcasting of the Behind-the-Meter Photovoltaic Systems," 2020 IEEE PES Innovative Smart Grid Technologies Europe (ISGT-Europe), The Hague, Netherlands, 2020 (Year: 2020).*

(Continued)

*Primary Examiner* — Catherine T. Rastovski
*Assistant Examiner* — Toni D Sauncy
(74) *Attorney, Agent, or Firm* — Patterson + Sheridan, LLP

(57) ABSTRACT

A method for monitoring a distributed energy generation system in an electrical system including a plurality of decentralized energy generation systems connected to a feeder line. The method includes, by an electronic controller of the electrical system: obtaining a model of a target decentralized energy generation system; acquiring output data from the decentralized energy generation system at a feeder level; determining if the target decentralized energy generation system is connected to the electrical distribution system; and determining, based on the acquired output data and the obtained model, the operational status and the generated electric power of the target decentralized energy generation system.

10 Claims, 2 Drawing Sheets

(56)        References Cited

U.S. PATENT DOCUMENTS

| 2017/0271877 A1 | 9/2017 | Stewart et al. |
| 2019/0036340 A1 | 1/2019 | Meeker et al. |
| 2020/0014207 A1* | 1/2020 | Bickel ..................... H02H 3/00 |

OTHER PUBLICATIONS

Souridi, et al., "A Probabilistic Modeling of Photo Voltaic Modules and Wind Power Generation Impact on Distribution Networks," IEEE Systems Journal, vol. 6, No. 2, pp. 254-259, Jun. 2012 (Year: 2012).*

European Search Report and Search Opinion dated Nov. 9, 2022 for European Patent Application No. EP22305699.5, 8 pages.

* cited by examiner

FIG.1

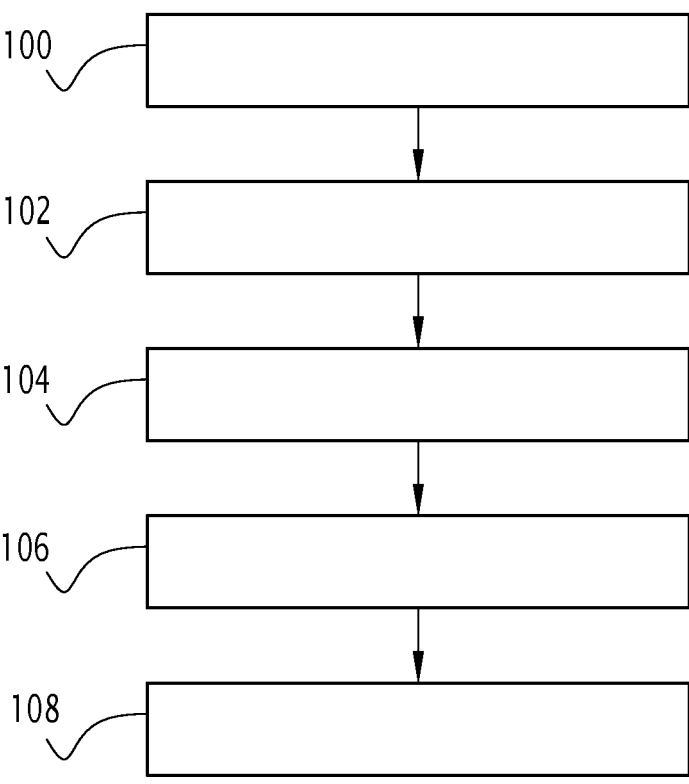
100
102
104
106
108
<u>FIG.2</u>

METHODS AND SYSTEMS FOR ESTIMATING THE OPERATIONAL STATUS OF AN ELECTRICAL GENERATOR IN A DISTRIBUTED ENERGY RESOURCE SYSTEM

TECHNICAL FIELD

The present disclosure relates to methods and systems for estimating the operational status and the generated electric power of an electrical generator in a distributed energy resource system. The invention is particularly applicable to distributed energy resource systems comprising photovoltaic panels.

BACKGROUND

Distributed energy resources (DER) refers to the use of small and decentralized electrical generators to supply electric power to a local electricity distribution system, such as a microgrid. Examples of such generators typically include photovoltaic (PV) panels, diesel generators, hydrogen-based fuel cells, and the like.

In a non limiting example, a local electricity distribution system can be used to connect PV panels installed on various residential buildings, such as houses, in a local energy community, for example to supply electric power to residential buildings and/or to commercial buildings and/or to local infrastructure such as lamp posts. The local electricity distribution system is connected to a main distribution grid, allowing clients to receive electric power from the grid and to sell the electric power produced by the PV panels during peak hours. In some cases, the local electricity distribution system can also be disconnected from the main grid and operate independently from the main grid.

Local electricity distribution systems usually comprise an electronic controller, such as a microgrid controller, to monitor the local generators in real time and supervise the local electricity distribution system in order to ensure a stable and reliable operation of the system as a whole.

A problem arises in some situations where the electronic controller cannot receive real time monitoring data from one (or more) of the local generators. A common issue with DER systems is that a generator may be impossible or difficult to monitor because of geographic constraints that limit or prevent real time communication with said generator, even though said generator is electrically connected to the local grid and can supply electric power to the local grid.

For example, when DER generators are installed in locations such as mountains, or islands, or rural areas, or undeveloped regions, or the like, it is common that one or more generators have to be placed in a location geographically isolated from the other generators (and from the local electronic controller). Setting up a reliable communications link capable of transmitting real time data between the local controller and said isolated generator may not always be feasible because of technical and/or economic considerations. This is especially true for PV panels, which often have to be installed in hard to reach locations in order to maximize solar irradiation and output power. Similar issues may arise because the PV panels (and more specifically the inverters) may lack communication capabilities, and/or because the PV panels belong to private customers, who may refuse to grant access to their PV panels data to the entity setting up the local energy community.

A drawback is that the local electricity distribution system may not be able to operate properly and efficiently if one or more generators cannot be monitored in real time by the local electronic controller.

SUMMARY

The object of the present invention is therefore to provide methods and systems for estimating the operational status and/or the generated electric power of an electrical generator in a distributed energy resource system.

The estimated operational parameter can be used in place of real time measured monitoring data to ensure proper operation of the local electrical distribution system.

According to an aspect of the invention, a method for monitoring a distributed energy generation system in an electrical system comprising a plurality of decentralized energy generation systems connected to a feeder line, each decentralized energy generation system comprising one or more electric generators, each decentralized energy generation systems being connected to the feeder line by a feeder connection point comprises, by an electronic controller of the electrical system:

obtaining a model of a target decentralized energy generation system, acquiring output data from the decentralized energy generation system at a feeder level, determining if the target decentralized energy generation system is connected to the electrical distribution system, determining, based on the acquired output data and the obtained model, the operational status and/or the generated electric power of the target decentralized energy generation system.

A resulting advantage is that the electronic controller is able to indirectly monitor any inaccessible local generator, using the operational status evaluated or extrapolated for said local generator(s).

According to advantageous aspects, the invention comprises one or more of the following features, considered alone or according to all possible technical combinations:

The decentralized energy generation systems are photovoltaic systems, each photovoltaic system comprising one or more photovoltaic generators.

Acquiring output data from said target decentralized energy generation system at a feeder level comprises measuring output voltage and/or output power at a measurement point located on the feeder line.

The model of the target decentralized energy generation system is a predefined model stored in a memory of the electronic controller, the model being parametrized by at least one technical parameter.

The technical parameter comprises at least one of the following parameters: the theoretical nominal power delivered by the solar panels of the photovoltaic generator, the solar irradiation angle of the solar panels, the efficiency of the solar panels, the amount of years for which the panels have been in operation.

Determining if the target decentralized energy generation system is connected to the electrical distribution system comprises using a trained machine learning algorithm on time series of the acquired output data to determine whether the target decentralized energy generation system is generating and delivering power to the feeder line through the feeder connection point.

Determining, based on the acquired output data and the obtained model, the operational status and/or the generated electric power of the target decentralized energy generation system comprises extrapolating data representative of the operational status and/or the generated electric power of the target decentralized energy generation system based on output of the acquired model.

The method further comprises automatically correcting at least one parameter of the acquired model based on the determined operational status and/or the generated electric power of the decentralized energy generation system.

The electrical system is a microgrid.

According to another aspect, an electrical system comprising a plurality of decentralized energy generation systems connected to a feeder line, each decentralized energy generation system comprising one or more electric generators, each decentralized energy generation systems being connected to the feeder line by a feeder connection point, comprises an electronic controller configured to:

obtain a model of a target decentralized energy generation system, acquire output data from the decentralized energy generation system at a feeder level, determine if the target decentralized energy generation system is connected to the electrical distribution system, determine, based on the acquired output data and the obtained model, the operational status and/or the generated electric power of the target decentralized energy generation system.

BRIEF DESCRIPTION OF THE DRAWINGS

The invention will be understood upon reading the following description, provided solely as an example, and made in reference to the appended drawings, in which:

FIG. 1 is a simplified block diagram of a distributed energy resource system according to an embodiment of the invention comprising an electrical distribution system connected to a plurality of electrical generators;

FIG. 2 is a simplified flow chart illustrating a mode of operation of the system of FIG. 1 according to an embodiment of the invention.

DETAILED DESCRIPTION OF SOME EMBODIMENTS

Figure 1:
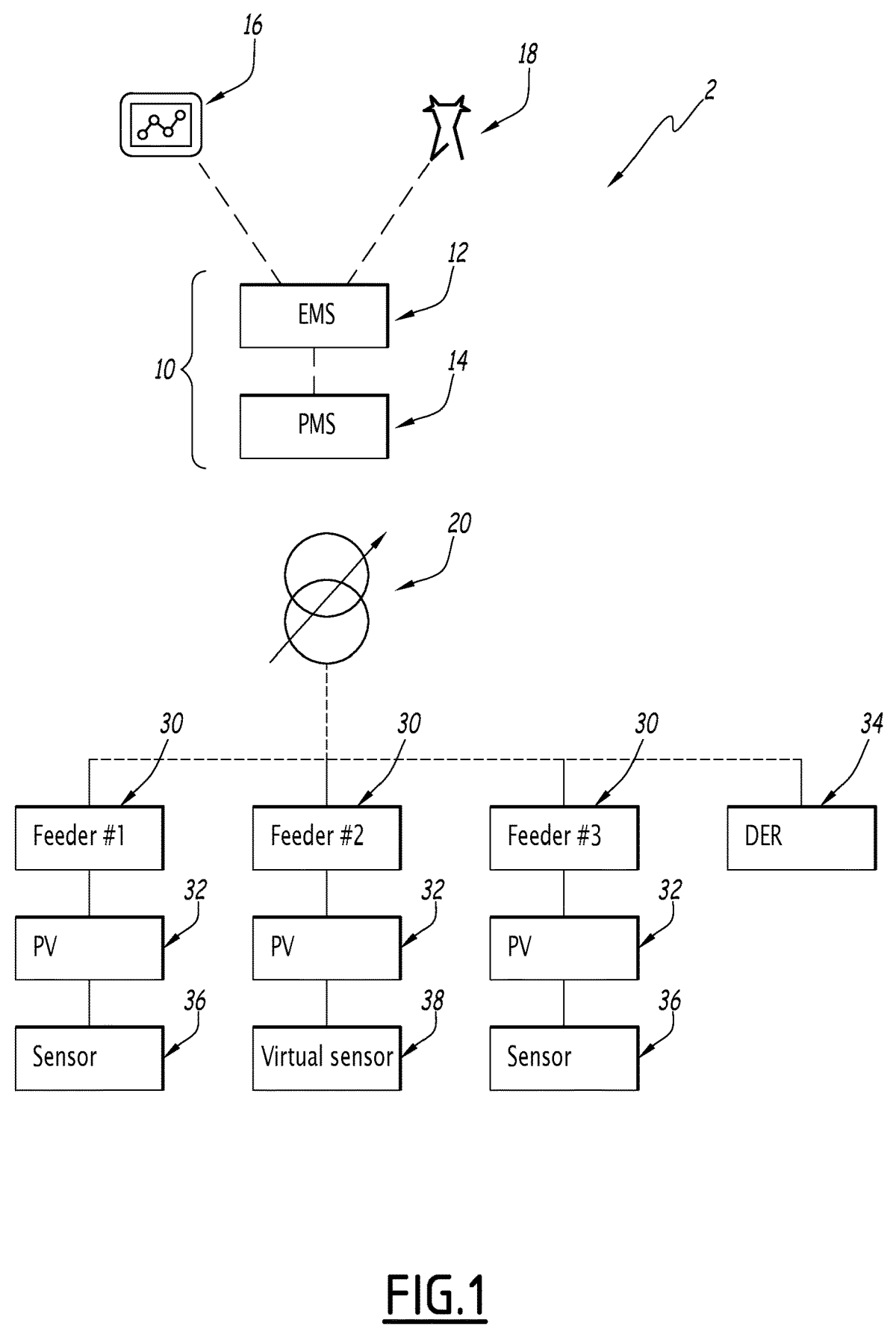

On FIG. 1 there is illustrated an exemplary electrical system 2 according to embodiments of the invention.

For example, the electrical system 2 is a distributed energy system (DER).

In preferred embodiments, the electrical system 2 is a microgrid.

In many embodiments, the electrical system 2 is a low voltage system (e.g. capable of delivering voltages of up to 700 V DC or 1000 V AC).

The electrical system 2 comprises a plurality of distributed energy generation systems (referenced 32 and 34 on FIG. 1) and a local electrical distribution system. The electrical system 2 may comprise one or more electrical conductors (such as low voltage busbars) for distributing electric power.

For example, the decentralized energy generation systems 32, 34 of the system 2 are part of a same "energy community". For example, an energy community is a group of decentralized electrical generation units operated by a same entity (e.g. by a same company or administration or group of individuals).

In the meaning of the present disclosure, "decentralized energy generation systems" refer to electrical sources capable of operating independently from a main power grid, such as photovoltaic panels (PV), wind turbines, battery electricity storage systems (BESS) such as electrochemical batteries or the like, diesel generator sets, and so on.

For example, each decentralized energy generation system 32, 34 comprises one or more electric generators connected to the local electrical distribution system (e.g., to a feeder line of the distribution system) by a feeder connection point 30.

It should be noted that, in order to clearly and concisely describe the present invention, the drawings are not necessarily to scale and some features may be presented in schematic form. For clarity, the electric loads are not illustrated on FIG. 1. In some embodiments, the generation systems 32 and/or 34 are connected to the low-voltage busbar are through feeders or incomers. Preferably, the DER systems 34 are part of such an incomer.

In other words, each decentralized energy generation system 32 corresponds to a group of electrical sources of similar nature electrically connected to a same connection point 30.

The electrical sources of a same group may, for example, be placed in a similar location close to each other, in a same facility, for example on the ground or on rooftops of a same building or of neighboring buildings. However, different groups of electrical sources (i.e., different systems 32) may be placed apart from each other in different locations, as will be explained in what follows.

In the following description, the invention is described in reference to a preferred embodiment in which the decentralized energy generation systems of interest are photovoltaic systems 32, each photovoltaic system 32 comprising one or more photovoltaic generators, such as photovoltaic panels connected to one or more inverters.

In the example of FIG. 1, given for explanatory purposes, the system 2 comprises three photovoltaic systems 32 respectively connected to one of three feeder connection points 30 (referenced Feeder#1 to Feeder #3).

The number of photovoltaic systems 32 may however be different in many embodiments. Additional distributed energy generation systems 34 are shown grouped separately but they are nonetheless electrically connected to the system 2.

Preferably, the electrical distribution system is capable of supplying electrical power to one or more electrical loads (not pictured) connected to the electrical system 2.

For example, the local electrical distribution system comprises one or more feeder lines connecting the distributed energy generation system to a primary circuit of a voltage transformer 20. The electrical loads can be connected to a secondary circuit of the voltage transformer 20. In many embodiments, both the loads and the electrical distribution system could be connected to the secondary circuit of a transformer.

The feeder lines comprise one or more electrical conductors for carrying electrical currents, such as alternating currents (AC currents).

The electrical system 2 comprises an electronic controller 10 capable of monitor and/or control the system 2.

In many embodiments, the electronic controller 10 comprises a generic processor, such as a microprocessor, or a microcontroller, or in a specific purpose processor such as a digital signal processor (DSP) or a graphical processor unit (GPU), or as an application-specific integrated circuit (ASIC), or in a field-programmable gate array (FPGA). In addition, analog circuits can be used to execute many of the same functions.

In preferred embodiments, the electronic controller 10 is an industrial personal computer.

The electronic controller 10 is configured to oversee operation of the system 2, for example to regulate the flow of electric power through the feeders and to ensure that the electrical loads are properly powered.

Preferably, in cases where the distribution system is a microgrid, then the electronic controller 10 is configured to implement microgrid management functions, e.g. using specific software modules.

For example, microgrid management may include automatic functions such islanding control, no-export control, stability control (to regulate voltage and/or frequency on the distribution system when disconnected from the mains power grid), disconnection preparedness (e.g., when the distribution system must be disconnected from the mains power grid), and so on. These roles and methods are well known in microgrid systems and are not described in detail in what follows.

To that end, in many embodiments, a control system of the system 2 comprises an Energy Management System module 12 (EMS) and a Power Management System module 14 (PMS).

In preferred embodiments, the PMS module 14 is implemented by the controller 10 (e.g., implemented by software means by the controller 10) while the EMS module 12 is implemented by a remote computer system, such as a remote server or a cloud computing platform. In some optional embodiments, both the PMS module 14 and the EMS module 12 may be implemented locally by the controller 10.

The controller 10 comprises communication means (e.g., a wired and/or a wireless communications interface) for exchanging data with one or more remote computer systems.

For example, the controller 10 may be connected to a first remote service 16 in order to acquire weather related information (e.g. weather forecasts, such as forecasts of wind speed and orientation and/or forecasts of solar irradiation) in order to estimate future energy production levels of renewable energy generation system such as PV panels or wind turbines.

In another example, the controller 10 can monitor in real time information relative to the status of the power mains grid.

In order to oversee operation of the system 2, the controller 10 is configured to monitor the distributed sources 32. The controller 10 may also be configured to operate protection devices and switchgear devices placed throughout the system 2, e.g. along the feeders.

In practice, the electronic controller 10 is configured to monitor the operational status of the distributed sources 32, for example using sensors 36 connected to each distributed sources group 32 (e.g., connected at the corresponding feeder connection points 30).

An objective of the invention is to ensure that the controller 10 can be able to monitor systems 32 even when one or more systems 32 cannot be monitored directly.

For example, geographic constraints may limit or prevent real time communication with said distributed sources 32, even though the corresponding distributed sources 32 are electrically connected to the feeder grid and can supply electric power to the feeder. Setting up a reliable communication link capable of transmitting real time data between the controller 10 and the corresponding distributed sources

32 may not always be feasible because of technical, privacy and/or economic considerations.

In many embodiments, one or more than one of the distributed sources 32 may be unable to be monitored by a sensor 36. Said distributed sources 32 are henceforth referred to as "isolated" or "inaccessible" distributed sources 32. In this example, one of the three distributed sources 32 cannot be monitored by a sensor 36.

The electronic controller 10 is configured to implement one or more virtual sensors 38 in order to estimate or extrapolate the operational status of the "inaccessible" distributed sources 32.

Preferably, a virtual sensor 38 is set up for every "inaccessible" distributed source 32, each virtual sensor 38 being dedicated to one of the "inaccessible" distributed sources 32.

Operation of the electronic controller 10 is now described in greater detail in reference to the exemplary embodiment of FIG. 2.

For example, the method is initialized when the system 2 starts operating.

During an initial step 100, a model of a target decentralized energy generation system 32 is automatically obtained by the electronic controller 10.

In the example shown on FIG. 1, the target (or "inaccessible") decentralized energy generation system 32 is connected to the feeder #2 through the second connection point 30 (Feeder #2).

For example, the model is a predetermined model stored in a memory of the electronic controller (10), the model being parametrized by at least one technical parameter.

The model is configured to simulate the operation of an electric generator by outputting a value representative of the output electrical power delivered to the feeder, based on environmental inputs such as solar irradiation in the case of solar panels.

The parameters of the model are representative of characteristic features of the generator, such as, in the case of solar panels, the theoretical nominal output power, the solar irradiation angle orientation of the panels, the inclination angle of the solar panels, the efficiency of the solar panels, the amount of years for which the panels have been in operation, and so forth. The parameters can be set for each individual solar panel of the generator, or for groups of solar panels, or for all solar panels of the generator.

Other parameters representative of a possible performance loss of the generators, such as ageing of the generator, conversion losses, derating losses, and the like, can also be used. In the case of solar panels, shade, the amount of dirt covering the solar panels, and the like can also be used.

The method is not limited to photovoltaic generators.

The precise nature of the model, its inputs, outputs and relevant technical parameters depends on the type of generator used in the DER system 32.

For example, the input data can be representative of wind speed and orientation (if the generators are wind turbines) or representative of a battery storage level (if the generators are batteries).

The model parameters can also be modified in consequence (e.g., battery storage capacity if the generators are batteries, elevation if the generators are wind turbines, and so on).

Preferably, the parameters of the model are set in advance, before initiating step 100.

For example, the parameters of the model can be based on field measurements performed during initial commissioning of the system 2, and/or obtained from specifications and datasheets obtained from the manufacturer of the generators, and/or extrapolated based on data accessible from the other "accessible" DER systems 32.

Once set, the model can be stored in a memory waiting to be retrieved by the controller at the beginning of step 100.

Then, during a step 102, output data from the decentralized energy generation system is acquired at a feeder level.

For example, acquiring output data from said target decentralized energy generation system at a feeder level comprises measuring output voltage and/or output power at a measurement point located on the feeder line, since acquiring data for the "inaccessible" DER system 32 alone may not be feasible.

Hence, total output voltage and/or output power are measured, using appropriate sensor(s), on one or more feeders in order to obtain a global power curve or a global load curve.

Preferably, the measurements are repeated over time, e.g. periodically, in order to build time series of data.

Then, during a step 104, the electronic controller 10 determines whether the target decentralized energy generation system 32 (i.e. the "inaccessible" system 32) is connected to the electrical distribution system (i.e., whether said system 32 is active and supplies one or more feeder lines with electric power through the corresponding feeder connection point 30).

Since direct measurements are not possible on the corresponding connection point 30 to which said system 32 is connected, the determination is performed indirectly.

In preferred embodiments, during step 104, a trained machine learning algorithm (or system) on time series of the acquired output data to determine whether the target decentralized energy generation system 32 is generating and delivering power to the feeder line through the feeder connection point.

Preferably, the machine learning algorithm is implemented by the electronic controller 10.

In non-limiting examples, the machine learning algorithm is an automated classifier.

For example, the machine learning algorithm is previously trained before step 100, for example during a test phase prior to commissioning the system 2, or using a testing data set representative of the operation of the system 2.

The goal of the training phase is for the machine learning algorithm to learn to detect and identify changes to the total output voltage and/or output power depending on the activation state of the target system 32 (i.e. depending on whether the system 32 is producing and delivering electrical power or not).

Then, during a step 106, the electronic controller 10, based on the acquired output data and the obtained model, determines the operational status of the target (the "inaccessible") decentralized energy generation system 32 and/or the electric power generated by said target DER system 32.

In other words, the controller 10 is capable of implementing a virtual sensor 38 attached, said virtual sensor 38 being configured to output data representative of the operational status in the same way as to the sensors 36.

As illustrated through the example of FIG. 1, the microgrid control system made of the EMS module 12 and the PMS module 14 can acquire information from inaccessible local DER systems 32 through virtual sensors 38. The virtual sensors 38 generate data representative of the operational status and/or the power generated by the inaccessible local DER systems 32. The data generated by the virtual sensors 38 is determined automatically, e.g. using machine learning technologies, based on data measured from local accessible DER systems 32 and from known specifications, parameters and properties of the inaccessible local DER systems 32.

The collected data is then used by the microgrid management processes previously described in order to ensure proper operation of the system 2 as a whole. Thus, with the virtual sensors 38, commonly used microgrid management processes and strategies can be used regardless of whether the DER Systems 32 are directly accessible or not.

Optionally, the method further comprises a step 108 of automatically correcting at least one parameter of the acquired model based on the determined operational status and/or the generated electric power of the decentralized energy generation system.

For example, one or more parameters of the acquired model can be corrected based on an identified discrepancy between the results of the model and measured data.

In many alternative embodiments, the method steps described above could be executed in a different order. One or more method steps could be omitted or replaced by equivalent steps. One or more method steps could be combined or dissociated into different method steps. The disclosed exemplary embodiment is not intended to be limiting and does not prevent other methods steps to be executed without departing from the scope of the claimed subject matter.

The embodiments and alternatives described above may be combined with each other in order to create new embodiments of the invention.

The invention claimed is:

1. A method for monitoring a distributed energy generation system in an electrical system comprising a plurality of decentralized energy generation systems connected to a feeder line, each decentralized energy generation system comprising one or more electric generators, each decentralized energy generation system being connected to the feeder line by a feeder connection point, wherein the method comprises, by an electronic controller of the electrical system:

executing a model of a target decentralized energy generation system of the plurality of decentralized energy generation systems, wherein the electronic controller receives real time communication from at least one of the plurality of decentralized energy generation systems but not the target decentralized energy generation system, acquiring output data from the plurality of decentralized energy generation systems at a feeder level, predicting if the target decentralized energy generation system is connected to the feeder line based on the acquired output data, estimating, based on the acquired output data and the model, the operational status and/or the generated electric power of the target decentralized energy generation system; and managing power flowing through the feeder line based on the operational status and/or the generated electric power.

2. The method according to claim 1, wherein the decentralized energy generation systems are photovoltaic systems, each photovoltaic system comprising one or more photovoltaic generators.

3. The method according to claim 1, wherein acquiring output data from said target decentralized energy generation system at a feeder level comprises measuring output voltage and/or output power at a measurement point located on the feeder line.

4. The method according to claim 1, wherein the model of a target decentralized energy generation system is a predefined model stored in a memory of the electronic controller, the model being parametrized by at least one technical parameter.

5. The method according to claim 4, wherein the technical parameter comprises at least one of the following parameters: the theoretical nominal power delivered by solar panels of a photovoltaic generator, the solar irradiation angle of the solar panels, the efficiency of the solar panels, the amount of years for which the solar panels have been in operation.

6. The method according to claim 1, wherein predicting if the target decentralized energy generation system is connected to the feeder line comprises using a trained machine learning algorithm on time series of the acquired output data to determine whether the target decentralized energy generation system is generating and delivering power to the feeder line through the feeder connection point.

7. The method according to claim 1, wherein estimating, based on the acquired output data and the model, the operational status and/or the generated electric power of the target decentralized energy generation system comprises extrapolating data representative of the operational status and/or the generated electric power of the target decentralized energy generation system based on output of the model.

8. The method according to claim 1, wherein the method further comprises automatically correcting at least one parameter of the model based on the determined operational status and/or the generated electric power of the decentralized energy generation system.

9. The method according to claim 1, wherein the electrical system is a microgrid.

10. An electrical system comprising:

a plurality of decentralized energy generation systems connected to a feeder line, each decentralized energy generation system comprising one or more electric generators, each decentralized energy generation system being connected to the feeder line by a feeder connection point; and an electronic controller configured to:

execute a model of a target decentralized energy generation system of the plurality of decentralized energy generation systems, wherein the electronic controller receives real time communication from at least one of the plurality of decentralized energy generation systems but not the target decentralized energy generation system, acquire output data from the plurality of decentralized energy generation systems at a feeder level, predict if the target decentralized energy generation system is connected to the feeder line based on the acquired output data, estimate, based on the acquired output data and the model, the operational status and/or the generated electric power of the target decentralized energy generation system; and manage power flowing through the feeder line based on the operational status and/or the generated electric power.

\* \* \* \* \*